United States Patent [19]

Delwiche

[11] Patent Number: 4,745,942
[45] Date of Patent: May 24, 1988

[54] FLOW REGULATING DEVICE

[76] Inventor: John L. Delwiche, Exxon USA, Marine Department, P.O. Box 1512, Houston, Tex. 77001

[21] Appl. No.: 947,692

[22] Filed: Dec. 30, 1986

Related U.S. Application Data

[62] Division of Ser. No. 628,821, Jul. 9, 1984, Pat. No. 4,632,139, which is a division of Ser. No. 291,355, Aug. 10, 1987, Pat. No. 4,458,714.

[51] Int. Cl.[4] .................................... B01D 17/025
[52] U.S. Cl. ............................ 137/172; 137/192; 137/433
[58] Field of Search .............. 137/172, 416, 433, 578, 137/202, 192

[56] References Cited

U.S. PATENT DOCUMENTS

| | | | |
|---|---|---|---|
| 1,995,742 | 3/1935 | Linnmann | 137/176 X |
| 2,115,043 | 4/1938 | Samiran | 137/172 |
| 2,551,404 | 5/1951 | Wiggins | 137/172 X |
| 2,691,386 | 10/1954 | Madison | 137/416 X |
| 3,467,135 | 9/1969 | Muskalla | 137/433 X |
| 4,132,238 | 1/1979 | Clark | 137/172 |

Primary Examiner—Alan Cohan
Attorney, Agent, or Firm—Limbach, Limbach & Sutton

[57] ABSTRACT

A device for the automatic regulation of fluid flows through an aperture for use with immiscible liquids having differing densities, wherein the volume, weight and shape of a floatable plug are selected to provide a negative buoyancy with respect to the less dense liquid and a positive buoyancy with respect to the denser liquid, and with the buoyancy of the plug in the various liquids determining whether the fluids will be permitted to flow through the aperture.

3 Claims, 3 Drawing Sheets

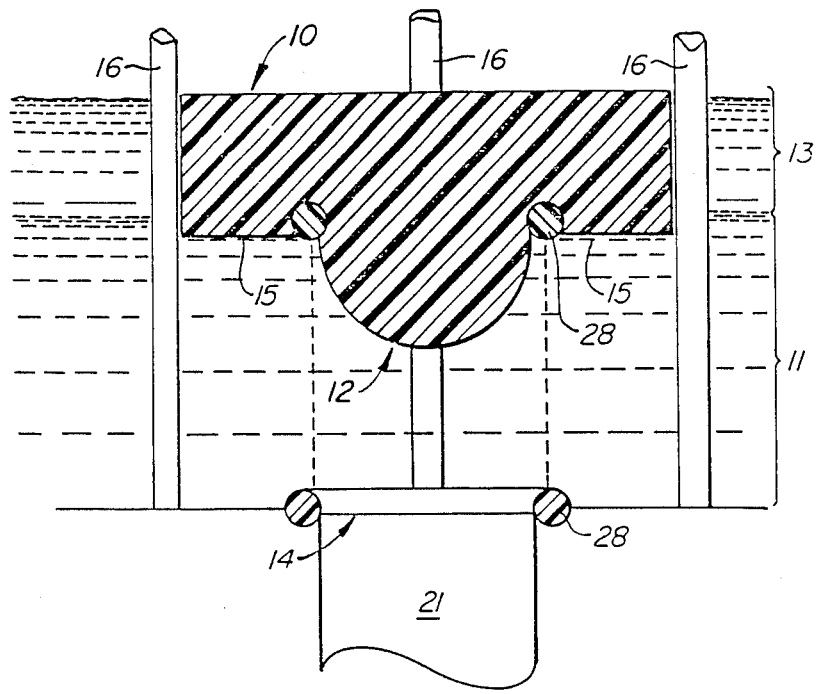
FIG._1.
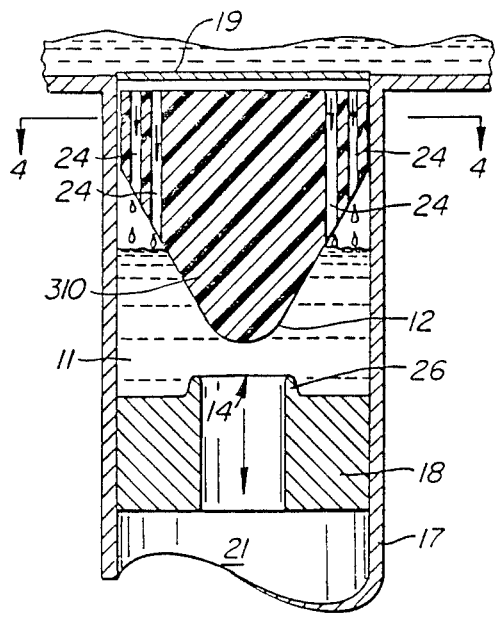
FIG._2.
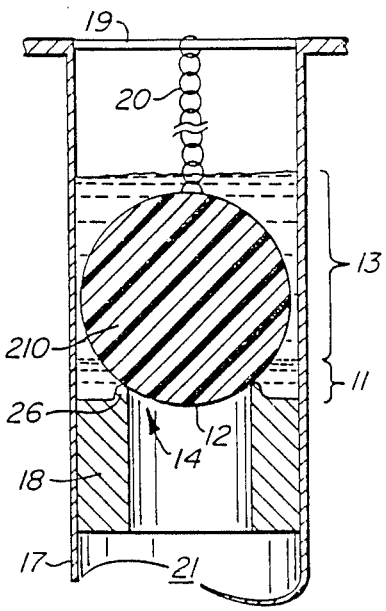
FIG._3.

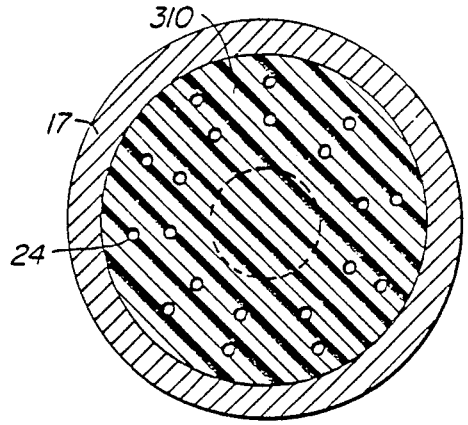
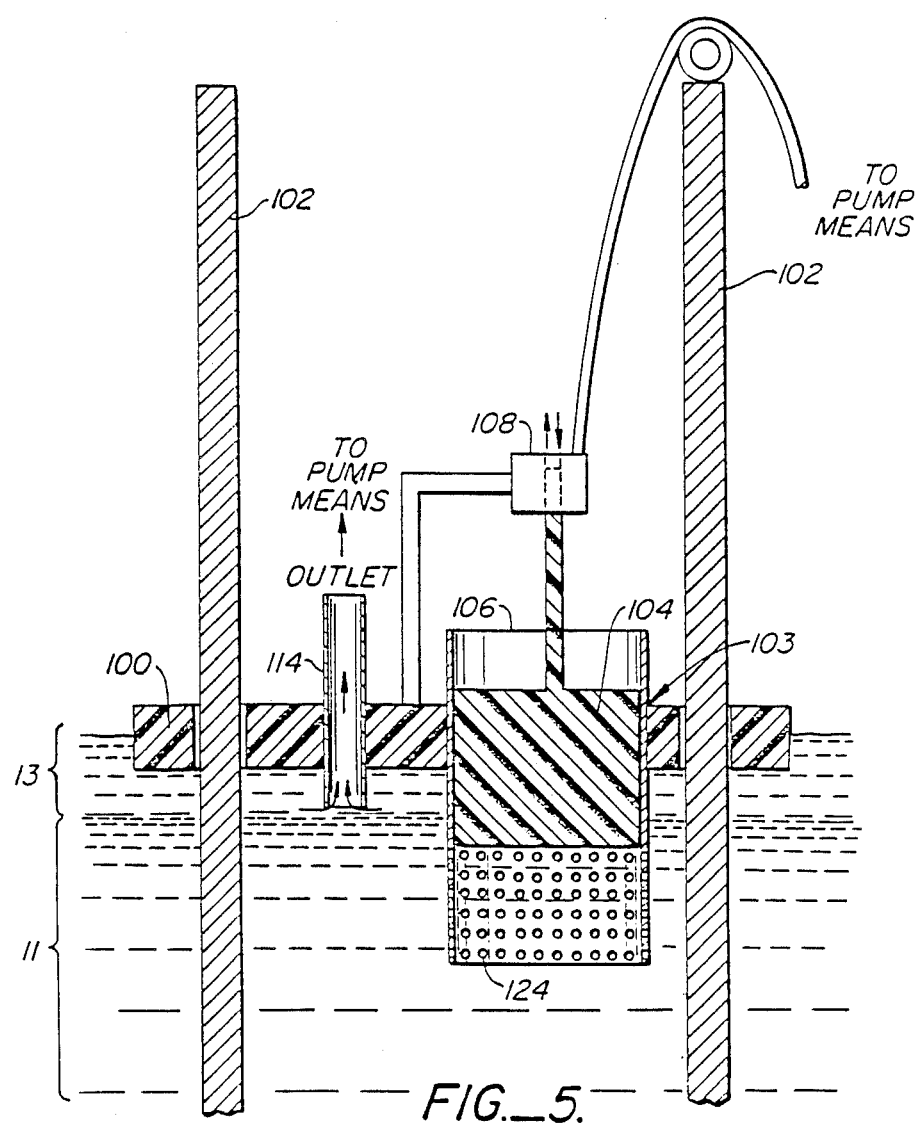

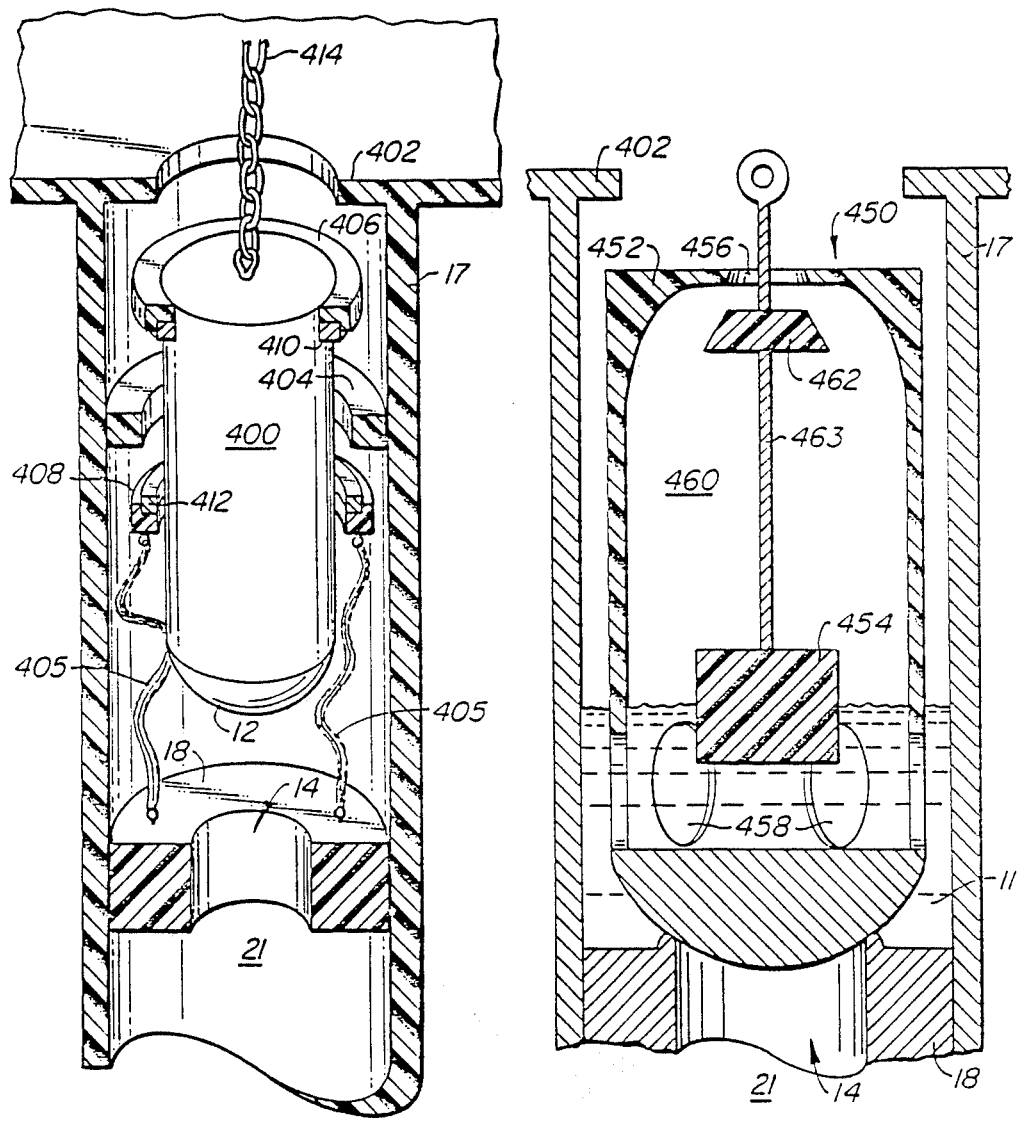
FIG._6.   FIG._7.

FLOW REGULATING DEVICE

This is a divisional of application Ser. No. 628,821, filed July 9, 1984, now U.S. Pat. No. 4,632,139, which was a division of application Ser. No. 291,355, filed Aug. 10, 1981, now U.S. Pat. No. 4,458,714.

BACKGROUND OF THE INVENTION

This invention relates generally to the regulation of fluid flowing through an aperture and, more specifically, to a moveable plug for permitting the flow of one type of liquid through an aperture and preventing the flow of another type of liquid through the same aperture. In general ship operation, there is a basic requirement that any water which lands on the deck of a ship be drained to prevent the accumulation of such water. Typically, the water is discharged through scuppers into the water below. Inevitably, and especially in connection with the operation of oil tankers, pollutants, such as oil, are also present on the decks of the ship and are also discharged. While it is desirable to remove all liquids from the deck of the ship, current environmental concerns render discharge of oil into the water below undesirable, if not illegal.

As such, the typical scupper arrangement is unsatisfactory. Typically, a scupper system includes a plurality of passageways leading from the deck of the ship to the side of the ship and open thereto. Either a manually moveable plug or hinged one-way doors within the scupper regulate the flow through the scupper. These previous scupper arrangements allow all liquids present on the deck of the ship to be discharged, and are incapable of discriminating between oil and water, for example.

In the case of the manually removable scupper plug, there is the added inconvenience of having to remove and replace the plug whenever any discharge of liquid is desired.

SUMMARY OF THE INVENTION

The foregoing and other problems of prior art scupper plugs are overcome by the present flow regulating device of the type for regulating fluid flow through an aperture in the presence of a first and a second fluid, the fluids having different densities, and being immiscible with each other. The device comprising a moveable plug having a density which is less than the density of the denser fluid but greater than the density of the less dense fluid and a flow aperture closure means. The moveable plug floats in the denser fluid and sinks in the less dense fluid and is moveable between a first position and a second position. In one embodiment, the plug has a mating surface which is shaped to seal the flow aperture upon contact with the aperture and is positioned so that it will contact the flow aperture whenever a predetermined quantity of the denser fluid is present. In another embodiment, the movement of the plug actuates pump means which then draw fluid from the aperture.

A guide means, for example, a cage, a pipe or a number of rods can be included to align the plug with respect to the aperture.

In the embodiment employing a mating surface and where water and oil are present, the oil would be the less dense fluid and the water will be the denser fluid. Thus, it can be seen that because the density of the plug is selected so that it floats in water and sinks in the oil, the flow aperture will remain open, and any water present will drain through the aperture, until such time that a predetermined amount of the water remains. At that point, the plug will make contact with the aperture, thereby sealing it, and preventing the oil from entering the aperture. The fluid flow, depending upon the kind of fluid present, can be regulated in either the top-to-bottom direction or bottom-to-top direction. For example, in the case where oil is present in a water storage tank, the oil can be drawn off from the top of the tank, while water can be prevented from escaping, by orientating the plug below the aperture, the aperture being located at the top of the tank. Water can then be pumped into the tank, thereby causing the liquid level in the tank to rise. The oil, which floats on top of the water, emerges through the flow aperture until such time that substantially all of the oil has been drawn off and the plug contacts with the flow aperture, thereby sealing it.

It is, therefore, an object of the present invention to provide a flow regulating device which regulates the flow of fluids through a flow aperture.

It is a further object of the present invention to provide a flow regulating device in which the movement of a moveable plug controls the flow of fluids through a flow aperture.

It is a still further object of the present invention to provide a moveable plug which seals an aperture to the flow of one fluid while opening the aperture to the flow of a different fluid having a different density.

It is another object of the present invention to provide an automatic scupper plug means for the selective draining of fluids from the deck of a ship.

It is another object of the present invention to provide a scupper plug which automatically permits water to drain through the scupper while preventing oil from draining through the scupper, the scupper plug comprising a material which is resistant to oil.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWING

FIG. 1 is a cross-sectional view of one embodiment of the invention.

FIG. 2 is a cross-sectional view of another embodiment of the present invention.

FIG. 3 illustrates an alternative configuration of the present invention.

FIG. 4 is a top view of one embodiment of the moveable plug taken along lines 4—4 of FIG. 2.

FIG. 5 illustrates a further embodiment of the present invention wherein plug movement controls pump means.

FIG. 6 illustrates an additional embodiment of the present invention including a retaining latch.

FIG. 7 illustrates a variable density plug.

DETAILED DESCRIPTION OF THE PRESENT INVENTION

Referring more particularly to FIG. 1, one embodiment of the invention will now be described. A plug 10 has a surface 12 which is shaped to mate with flow aperture 14. The plug 10 is aligned with respect to the flow aperture 14 so that the mating surface 12 moves easily in and out of contact with the flow aperture 14. In order to facilitate this alignment, guides can be used, such as rods 16 as shown in FIG. 1, a pipe, or a cage, for example.

The flow aperture, which is to be sealed by the plug 10, can be the opening of the scupper itself, see FIG. 1, or can be included in a base member 18, which is positioned within a scupper tube 17. The internal scupper area is designated by reference numeral 21. FIGS. 2 and 3 illustrate the use of such a base member 18, and the location of the flow aperture 14 therein, within the scupper tube 17.

The plug can take on a number of shapes which include a ball shape 210, as shown in FIG. 3; a cap shape 10, as shown in FIG. 1; a cone shape 310, as shown in FIG. 2; or a cylindrical shape as in FIG. 6. The principal requirement for all of the plug shapes is that, for the density of plug material used, the buoyancy of the plug is to be such that the plug will float in the denser liquid 11 (positive buoyancy) and sink in the less dense liquid 13 (negative buoyancy).

For example, water has a specific gravity of 1.0, while petroleum products have specific gravities which range between approximately 0.78 and 0.91. Alaskan crude oil, for example, has a specific gravity which ranges from approximately 0.80 to 0.85. For the above combination of oil and water, the buoyancy of the plug 10 should be selected to fall between 1.0 and 0.91; for example 0.95.

The buoyant force which acts upon an object submerged in a fluid is equal to the weight of that body of fluid which the submerged object displaces. When the buoyant force is less than the weight of the object, the object will sink. On the other hand, if the buoyant force is greater than the weight of the object, the object will float. Therefore, in order to provide a plug which sinks in oil and floats in water, the volume of the plug and the weight of the plug are selected to provide a buoyant force for the plug in water which is greater than the weight of the plug and, on the other hand, a buoyant force for the plug in oil whic is less than the weight of the plug.

An additional consideration in the construction of the plug 10 is the effect of the chemical properties of the various fluids present upon the material used to construct the plug. For example, in the presence of petroleum products, a rubber material would be unsatisfactory. In such case, one satisfactory material is a combination of epoxy, sawdust, and iron filings or shavings. The proportions of each could be varied to achieve the desired volume and density. Alternatively, steel or lead is also a satisfactory material. On the other hand, if acids are involved, metallic materials would be unsatisfactory but plastics could be used.

While the primary consideration in the construction of the plug 10 is that the weight and volume, the shape of the plug affects the effectiveness with which the aperture can be sealed in the presence of different quantities of the various fluids.

FIG. 3 illustrates one embodiment wherein a spherically shaped plug 210 is utilized. The advantage of such a shape is that any surface of the plug is suitable for sealing the aperture 14. On the other hand, the spherical shape of the plug presents a small surface area upon which the buoyant force of water, for example, can work to dislodge the plug from the flow aperture 14, when the plug is surrounded by water.

This problem is reduced by the shape of the plug shown in FIG. 1. This embodiment utilizes a half sphere as the mating surface 12 for sealing the flow aperture, while providing a large surface area upon which the buoyant force of the water can act. This large surface area is in the form of the disk-like portion of the plug. With such a configuration, when the water fully surrounds the plug, a large buoyant force can be exerted upon the under side of the plug. A large upward buoyant force is thereby provided to overcome the downward pressure exerted upon the plug by the liquid above the plug, and any negative pressure present within the scupper hole itself.

A further embodiment of the plug shape is illustrated in FIG. 2, wherein a cone-shaped plug 310 is utilized. The angularly rising walls of the cone above the point where the cone mates with the flow aperture 14, provide a sufficient surface area upon which the buoyant force can act.

A further consideration in the configuration of the present invention is the alignment of the plug 10 with the flow aperture 14. In FIG. 1, rods 16 are used to guide the plug 10. An alternative guide can be a pipe (not shown) having an inner diameter which is slightly larger than the maximum diameter of the particular plug configuration used. Another guide can be constructed of a screen cage, not shown.

In the case of the screen cage guide and the rod guide 16, the liquids are free to enter the scupper and aperture area and to interact with the plug from all directions. On the other hand, when a pipe guide is used passageways should be provided for liquid flows. In the case where the plug is positioned within the scupper tube 17 itself, as in FIGS. 2 or 3, passageways can be provided either through the plug or around the plug, so that the liquids may pass to the bottom side of the plug. Otherwise, the denser fluid will not reach the underside of the plug and the plug will not be dislodged from the flow aperture 14. FIG. 2 illustrates vertical passageways 24 provided within the plug 310 to permit the passage of the fluids. FIG. 4 is a top view of the cone plug 310 showing the position of the passageways 24.

Alternatively, the cone plug diameter can be made smaller to provide space between the plug and the guide wall to permit the fluids to pass. In FIG. 3, the maximum outer diameter of the plug 210 is shown to be less than the inner diameter of the scupper tube 17, thereby permitting fluid to pass between the tube 17 and the plug 210, to the bottom of the plug 210.

A further embodiment to the present invention includes a retaining means to prevent the plug from being dislodged from the guide during times of high and tubulent liquid flows. In FIG. 3, a cross-pin 19 and chain 20 combination is illustrated. In FIG. 2, a cross-pin 19 across the top of the guide 17 prevents the plug 310 from being expelled from the guide 17.

In a further embodiment of the present invention the flow aperture 14 is shaped to have an annular lip 26, FIG. 2, which enhances the seal obtained by the mating of the plug 10 with the flow aperture 14. FIG. 3 illustrates the use of a lip 26 formed as a part of the base 18. FIG. 1 illustrates the use of "O" rings 28, as an alternative to the lip 26, attached both to the flow aperture 14 and to the mating surface 12 of the plug 10.

Up to this point use of the present invention to prevent the flow of less dense fluids has been discussed. Conversely, the plug 10 can be used in reverse fashion to permit the flow of the less dense liquid through the aperture and to prevent the flow of the denser liquid through the aperture. To implement this the plug 10 is located below the flow aperture 14 as are the liquids. The mating surface 12 is positioned on the plug to mate with the flow aperture 14 as the level of the denser liquid rises toward the flow aperture. Because the less dense liquid is immiscible with the denser liquid, and thereby floats on the denser liquid, the less dense liquid will flow through the flow aperture 14 as the level of the denser liquid rises toward the flow aperture 14. This type of flow is counter gravitational; that is, means such as a pump provide sufficient energy to the contained fluids such that gravitational force is overcome and the fluids flow against gravity. Eventually, the plug 10 and mating surface 12 will make contact with the flow aperture, thereby sealing the flow aperture 14 to any liquid flow.

While, for illustrative purposes, the present invention has been described in the context of oil and water as the fluids of interest, it is to be understood that the invention is operable with any fluids which are immiscible and which have different densities.

A still further embodiment of the present invention utilizes the positive/negative buoyancy of the plug to control pump means (not shown) for pumping one liquid in the presence of a different liquid. See FIG. 5. A platform 100 is constructed to float upon the liquids which are present, the platform 100 being aligned within the liquid by guides 102. Positioned on the platform 100 are a plug 104 and guide 106 combination, the plug 104 being connected to an electronic switch or valve control 108. The electronic switch or valve control 108 is communicatively coupled to a pump means. The flow aperture 14 is contained within the platform 100 in the form of an outlet pipe 114 which is communicatively coupled to the pump means. The moveable plug 104 and guide 106 combination extend through the platform 100 through plug aperture 103.

The portion of the outlet pipe 114 which extends into the liquid is positioned to coincide with the level, with respect to the platform 100, of the denser liquid 11, at which the plug 104 deactivates the switch 103 to turn the pump means off. This position is referred to as the first position. Preferably, this first position corresponds to the condition where substantially all of the less dense liquid 13 has been drawn off.

Whenever there is a significant amount of less dense liquid 13 present, the platform 100 will float thereon and the plug 104 will sink therein, thereby causing the plug 104 to assume a second position wherein the switch 108 is activated by the plug 104 and the pump means is turned on.

Apertures 124 are shown in the portion of the guide means 106 which is submersed in the liquids. These apertures 124 permit the various liquids to interact with the plug 104. Because the platform 100 floats on the surface of the liquid, no matter what the level of the liquids the plug 104 will be operative to control the pumping of the less dense fluid from the tank.

During times of rough weather, the resulting motion of the ship can be sufficient to dislodge the flow regulating device of the present invention, thereby permitting fluids to escape through the scupper tube, thus permitting any oil which has accumulated to escape. It is, therefore, highly desirable to devise a means for retaining the scupper plug in contact with the flow aperture whenever any appreciable amount of oil is present, but at the same time to permit the plug to be dislodged from the flow aperture when only water is present.

FIG. 6 illustrates one embodiment of the present invention wherein the above is accomplished. This embodiment utilizes a cylindrically shaped plug and a latching means. The plug 400 is positioned within the scupper tube interior 21 and above the base member 18, which contains the aperture 14. The plug 400 has a diameter which is smaller than that of the scupper tube 17. The scupper tube 17 has a retaining lip 402 positioned at its top. The inner diameter of the retaining lip 402 is selected to be smaller than the diameter of the plug 400 so that the plug will be retained within the scupper tube even in the roughest seas.

Also positioned on the scupper tube, approximately one-third of the distance from the top of the tube, is a retaining collar 404. The inner diameter of this collar is selected so that the plug 400 can easily move up and down through it. Positioned toward the top of the plug 400 is a fixed collar 406. The outer diameter of this fixed collar 406 is chosen to be larger than the inner diameter of the retaining collar 404.

Positioned below the retaining collar 404, and concentrically with the plug 400 is a moveable collar 408. The inner diameter of the moveable collar 408 is selected so that the collar 408 is free to move up and down along the plug 400. Likewise, the outer diameter of the moveable collar 408 is selected to be larger than the inner diameter of the retaining collar 404 so that the moveable collar 408 is prevented from travelling upward in the scupper tube interior 21 beyond the retaining collar 404.

The moveable collar 408 has a density which is less than the density of any of the fluids expected to be present. As such, the moveable collar 408 will float in any of the fluids. The moveable collar also contains a number of magnetic elements 412. These magnetic elements 412 can take the form of a ring of magnetic material embedded along the circumference of the moveable collar, or a number of magnetic elements which are embedded at specific locations along the circumference of the collar. The fixed collar 406 also contains magnetic material 410 embedded therein. As with the moveable collar 408, this magnetic material can be a ring of magnetic material, or individual pieces of magnetic material. The surrounding material, including the scupper tube 17 material, should be non-magnetic. In any case, the north/south orientation of the magnetic material in the fixed collar 406 is positioned with respect to the north/south orientation on the magnetic material embedded within the moveable collar 408 such that the fixed collar 406 and the moveable collar 408 are magnetically attracted to each other. In this manner, whenever the fixed collar 406 and the moveable collar 408 are in close proximity to each other, a magnetic coupling force between the two collars will arise, thereby causing fixed collar 406 to be drawn tightly against retaining collar 404. This occurs when the level of fluid in the scupper tube 17 approaches the retaining collar 404 position and an appreciable amount of the fluid is less dense fluid 13. In this manner, plug 400 can be latched into a predetermined position, from which it will not be dislodged until the user manually uncouples the fixed collar 406 from the moveable collar 408.

The distance of the retaining collar 404 from the base member 18 is selected so that the mating surface 12 of the plug 400 is in contact with the aperture 14 when the fixed collar and moveable collar are in a latched position. In place of a retaining collar 404, restraining structures, such as cables 405, can be used to limit the maximum distance that the moveable collar can be positioned from the aperture 14. See FIG. 6.

The fixed collar can be uncoupled from the moveable collar 408 in a number of ways, including the use of a chain 414. The user simply pulls on the chain 414, supplying enough force to overcome the magnetic coupling force.

A further embodiment of the moveable plug is illustrated in FIG. 7. The plug illustrated therein provides a variable density A variable density property is useful for several reasons. One reason is to provide a delay upon the entry of fluid into the scupper hole before the plug is dislodged from the aperture. This delay is useful when both fluids are flowing into the scupper hole at once. Though the fluids are defined to be immiscible, there is some initial mixing when the liquids first enter the scupper tube. There is a finite delay between the time the fluids first enter the scupper tube, and the point in time at which the fluids are separated from each other. The variable density plug to be described in detail following, ensures that a predetermined amount of fluid has entered into the scupper tube, and that at least a certain portion of that fluid is the denser fluid 11 before permitting the plug to be dislodged from the aperture.

A second reason for providing a variable density plug is to make doubly sure that in the presence of the less dense fluids, the plug will sink, and in the presence of the denser fluids, the plug will float.

Referring more specifically to FIG. 7, the variable density plug will now be described. In FIG. 7, the variable density plug 450 is shown positioned within a scupper tube 21. The plug itself includes an outer body 452, an inner plug 454, and air passageway 456, and a number of fluid passageways 458. The outer body 452 has a chamber 460 in which the inner plug 454 is positioned. Also included with the variable density plug is a valve means 462 for controlled sealing of the air passageway 456. One embodiment of such valve means is a stopper-like member which is shaped to seal the air passageway 456. The variable density plug includes means for coupling the inner plug 454 to the valve means 462. In FIG. 7 this coupling means is shown to be a shaft 463, for example.

The density of the inner plug 454 is selected so that it is greater than the density of the less dense fluid 13, and less than the density of the denser fluid 11.

The variable density plug 450 operates in the following manner. When no fluid is present within the scupper tube interior 21, the mating surface 12 of the variable density plug 450 is in contact with the aperture 14 The chamber 460 is filled entirely with air. The valve means 462 is positioned so that air can flow between the chamber 460 through the air passageway 456 to the exterior of the variable density plug 450. The fluid passageways 458 which are positioned below the air passageway 456 provide access to the chamber 460 from the exterior of the variable density plug 450.

When fluid first enters the scupper tube interior 21, the fluid flows into the chamber 460 through the fluid passageway 458. If the fluid is the less dense fluid 13, the inner plug 454 will not be affected by the entry of the less dense fluid into the chamber 460. As more fluid flows into the chamber 460, the air, originally within the chamber 460, is permitted to escape through the air passageway 456. In this manner, the fluid level of the less dense fluid 13 within the chamber 460 will follow the fluid level of the less dense fluid 13 in the scupper tube interior 21, and external to the variable density plug 450. Therefore, it is ensured that the variable density plug 450 will have a density no greater than that of the less dense fluid 13 and therefore will not be dislodged from contact with the aperture 14.

If, on the other hand, the denser fluid 11 enters the scupper tube 17, the denser fluid 11 entering the chamber 460 through the fluid passageway 458 will tend to cause the inner plug 454 to be buoyed upward. As such, when sufficient denser fluid 11 enters the chamber 460, the buoying of the inner plug 454 by the denser fluid 11 causes the valve means 462 to close off the air passageway 456 to any further escape of air from the chamber 460. In this manner, the density of the variable density plug 450 is fixed at a maximum value. The positioning of the inner plug 454, the valve means 462, and the length of the chamber 460 are chosen so that when the valve means 462 closes the air passageway 456 to further escape of any air, the density of the variable density plug 450 will be well below that of the denser fluid 11.

It can likewise be seen that when a mix of less dense and denser fluid enters the scupper tube, the density of the mixture must be greater than the density of the inner plug 454 in order that the inner plug be buoyed upward to close off the air passageway. Until such time that this density is achieved, the variable density plug 450 will remain in contact with the aperture and prevent the escape of any liquid through the aperture. It can also be seen that, after the two fluids have had enough time to separate from each other, at that point the denser fluid 11 will have an opportunity to act upon the inner plug 454 and cause the air passageway to be closed off, thereafter permitting the variable density plug 450 to be dislodged from the aperture 14.

The variable density plug 450, therefore, provides a predetermined amount of delay before permitting itself to be dislodged from the aperture 14, thereby ensuring that only the desired fluid 11 escape through the aperture. The variable density plug 450 also provides a double check on the density of the plug with respect to the less dense 13 and the denser fluid 11, so that the plug 450 has a density which is greater than the density of the less dense fluid 13, and less than the density of the denser fluid 11.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

What is claimed is:

1. A device for regulating the flow of a first fluid and a second fluid through a flow aperture, the fluids being immiscible with each other and having different densities, the flow regulating device comprising a moveable plug having a density which is less than the density of the denser fluid but greater than the density of the less dense fluid so that the plug floats in the denser fluid and sinks in the less dense fluid, the plug being moveable between a first and a second position; the plug assuming the first position when the surface level, with respect to the flow aperture, of the denser fluid is greater than a predetermined amount, and, the plug assuming the second position when the surface level with respect to the flow aperture of the denser fluid is less than the predetermined amount; the plug permitting the flow of fluid through the flow aperture when the plug is located at the first position and blocking the flow of fluid through the flow aperture when the plug is located at the second position; and latching means for securing the plug in the second position when the surface level with respect to the aperture of the less dense fluid exceeds a predetermined amount, wherein the plug has a vertical axis and further wherein the latching means include a first collar, which is mounted to the plug concentric with the vertical axis of the plug, the first collar having a first plurality of magnetic elements embedded therein, the magnetic elements each having a predetermined orientation;

a second collar, which is moveably positioned about the plug and oriented coaxially with the vertical axis of the plug, the second collar having a density which is less than the density of the less dense fluid, the second collar having a second plurality of magnetic elements embedded therein, the magnetic elements of the second plurality each having a predetermined orientation so that the second collar is magnetically attractive to the first collar, and so that the second collar is attracted to and becomes magnetically coupled to the first collar whenever the second collar is positioned within a short distance from the first collar; and retaining means for restraining the movement of the plug once the second collar has been magnetically coupled to the first collar.

2. The flow regulating device, as recited in claim 1, wherein the flow regulating device is positioned within a scupper tube and further wherein the retaining means include a third collar mounted to the scupper tube, coaxially with the vertical axis of the plug, and between the first collar and the second collar, so that the third collar is gripped between the first and the second collar when magnetic coupling occurs between the first and second collars.

3. The flow regulating device, as recited in claim 1, wherein the flow regulating device is positioned within a scupper tube and further wherein the retaining means include a plurality of extendible, elongated structures, each structure being attached at one end to the scupper tube and at the other end to the second collar, the fully extended length of each structure being selected to limit the upward movement of the second collar so that the plug is held against the aperture when the first collar is magnetically coupled to the second collar.

* * * * *